United States Patent
DeCusatis et al.

(10) Patent No.: US 9,007,905 B2
(45) Date of Patent: *Apr. 14, 2015

(54) SYSTEM TO IMPROVE AN ETHERNET NETWORK

(71) Applicant: International Business Machines Corporation, Armonk, NY (US)

(72) Inventors: Casimer M. DeCusatis, Poughkeepsie, NY (US); Thomas A. Gregg, Highland, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/708,935

(22) Filed: Dec. 8, 2012

(65) Prior Publication Data

US 2013/0128721 A1    May 23, 2013

Related U.S. Application Data

(63) Continuation of application No. 13/299,336, filed on Nov. 17, 2011.

(51) Int. Cl.

| | |
|---|---|
| H04L 12/26 | (2006.01) |
| H04L 12/947 | (2013.01) |
| H04L 12/24 | (2006.01) |
| H04L 12/801 | (2013.01) |
| H04L 12/835 | (2013.01) |

(52) U.S. Cl.
CPC ............ *H04L 49/25* (2013.01); *H04L 41/06* (2013.01); *H04L 47/18* (2013.01); *H04L 47/30* (2013.01); *H04L 47/34* (2013.01)

(58) Field of Classification Search
None
See application file for complete search history.

(56) References Cited

U.S. PATENT DOCUMENTS

| 7,606,253 | B2 | 10/2009 | Lesartre et al. ......... G06F 12/06 |
| 7,653,060 | B2 | 1/2010 | Mayhew et al. .......... H04L 1/00 |
| 2005/0094632 | A1 | 5/2005 | Hebsgaard et al. ....... H04L 1/00 |
| 2006/0268708 | A1* | 11/2006 | Speight et al. ................. 370/235 |
| 2008/0025334 | A1 | 1/2008 | Smith et al. ............... H04J 1/16 |
| 2009/0213861 | A1 | 8/2009 | Benner et al. .......... H04Q 11/00 |
| 2010/0111095 | A1* | 5/2010 | Trossell et al. ................ 370/401 |
| 2010/0183024 | A1* | 7/2010 | Gupta ........................... 370/463 |
| 2010/0260049 | A1* | 10/2010 | Racz et al. .................... 370/235 |
| 2011/0216650 | A1* | 9/2011 | Jin et al. ........................ 370/230 |
| 2011/0261691 | A1* | 10/2011 | Jin et al. ........................ 370/230 |

* cited by examiner

*Primary Examiner* — Chirag Shah
*Assistant Examiner* — Joshua Smith
(74) *Attorney, Agent, or Firm* — Steven Chui

(57) ABSTRACT

A system to improve a Fiber Channel over Convergence Enhanced Ethernet (FCoCEE) network may include a sender in an FCoCEE network in which data packets having different data link layer structures are transmitted by the sender on a single data link. The system may also include a receiver to receive the data packets at the data link layer and to transmit an ACK and/or NAK in response to a sequence number in the data packets. The system may further include a replay buffer to retransmit the data packets where the replay buffer is sized by the length of the data link, data rate of the data link, the ACK and/or NAK processing time at either the sender and/or the receiver, and/or a threshold time for transmission and/or reception of the data packets.

4 Claims, 10 Drawing Sheets

SYSTEM TO IMPROVE AN ETHERNET NETWORK

CROSS-REFERENCE TO RELATED APPLICATIONS

This is a Continuation Application to U.S. patent application Ser. No. 13/299,336 entitled "SYSTEM TO IMPROVE AN ETHERNET NETWORK", filed Nov. 17, 2011, which application is incorporated herein by reference.

BACKGROUND

The invention relates to the field of computer networking, and, more particularly, to computing networking.

The Fibre Channel over Ethernet ("FCoE") standard was developed to enable the use of Fibre Channel over Ethernet networks. In addition, the Convergence Enhanced Ethernet ("CEE") specification may include FCoE and be referred to as FCoCEE.

SUMMARY

According to one example embodiment of the invention, a system to improve an FCoCEE network may include a replay buffer to retransmit data packets in a Fibre Channel over Convergence Enhanced Ethernet (FCoCEE) network in which data packets having different data link layer structures are transmitted by a sender and received by a receiver at a data link layer. In this system, the receiver transmits an acknowledge signal (ACK) and/or a no acknowledge signal (NAK) in response to a sequence number in the data packets. Furthermore, the replay buffer is sized by the length of a single data link, the ACK and/or NAK processing time at either the sender and/or the receiver, and/or a threshold time for transmission and/or reception of the data packets. The replay buffer may operate at the FCoCEE network's physical layer.

The system may further include a delimiter to indicate additional reliable link layer sequence number bytes. If a reliable link layer is enabled, sequential Packet Sequence Numbers may be grouped together as a common traffic class and/or given priority for this frame type and/or this ACK type. The replay buffer may provide allocation to multiple priority groups with link layer recovery enabled to avoid overflow.

The sender may modify the data packet's EtherType field so each data packet comprises a sequence number. The receiver verifies and/or sends an ACK and/or NAK based on sequence number comparison.

The replay buffer may resend unacknowledged data packets. The sender may refresh the sequence numbers and/or purge the replay buffer for data link failure and/or data link recovery.

Another example aspect of the invention is a method to improve an FCoCEE network. The method includes receiving at a receiver data packets having different data link layer structures on a single data link at the data link layer via a sender through a Fibre Channel over Convergence Enhanced Ethernet (FCoCEE) and transmitting an ACK and/or NAK in response to a sequence number in the data packets. The method may further include retransmitting the data packets via a replay buffer that is sized by the length of the data link, the ACK and/or NAK processing time at either the sender and/or the receiver, and/or a threshold time for transmission and/or reception of the data packets.

The method may also include operating the replay buffer at the FCoCEE network's physical layer. The method may further include modifying the data packet's EtherType field so each data packet comprises a sequence number via the sender.

The method may additionally include indicating additional reliable link layer sequence number bytes via a delimiter, and if a reliable link layer is enabled, sequential Packet Sequence Numbers are grouped together as a common traffic class and/or given priority for this frame type and/or this ACK type. The method may also include verifying and/or sending an ACK and/or NAK based on sequence number comparison performed by the receiver. The method may further include resending unacknowledged data packets via the replay buffer and/or the sender refreshing the sequence numbers and/or purging the replay buffer for data link failure and/or data link recovery.

Another example aspect of the invention is computer readable program codes coupled to tangible media to improve an FCoCEE network. The computer readable program codes may be configured to cause the program to receive at a receiver data packets having different data link layer structures on a single data link at the data link layer via a sender through the FCoCEE and transmit an ACK and/or NAK in response to a sequence number in the data packets. The computer readable program codes may further retransmit the data packets via a replay buffer that is sized by the length of the data link, data rate of the link, the ACK and/or NAK processing time at either the sender and/or the receiver, and a threshold time for transmission and/or reception of the data packets.

The computer readable program codes may also operate the replay buffer at the FCoCEE network's physical layer. The computer readable program codes may additionally modify the data packet's EtherType field so each data packet comprises a sequence number via the sender.

The computer readable program codes may also indicate additional reliable link layer sequence number bytes via a delimiter, and if a reliable link layer is enabled, sequential Packet Sequence Numbers are grouped together as a common traffic class and/or given priority for this frame type and/or this ACK type. The computer readable program codes may additionally verify and/or send an ACK and/or NAK based on sequence number comparison via the receiver.

DETAILED DESCRIPTION

The invention will now be described more fully hereinafter with reference to the accompanying drawings, in which preferred embodiments of the invention are shown. Like numbers refer to like elements throughout.

Figure 1:
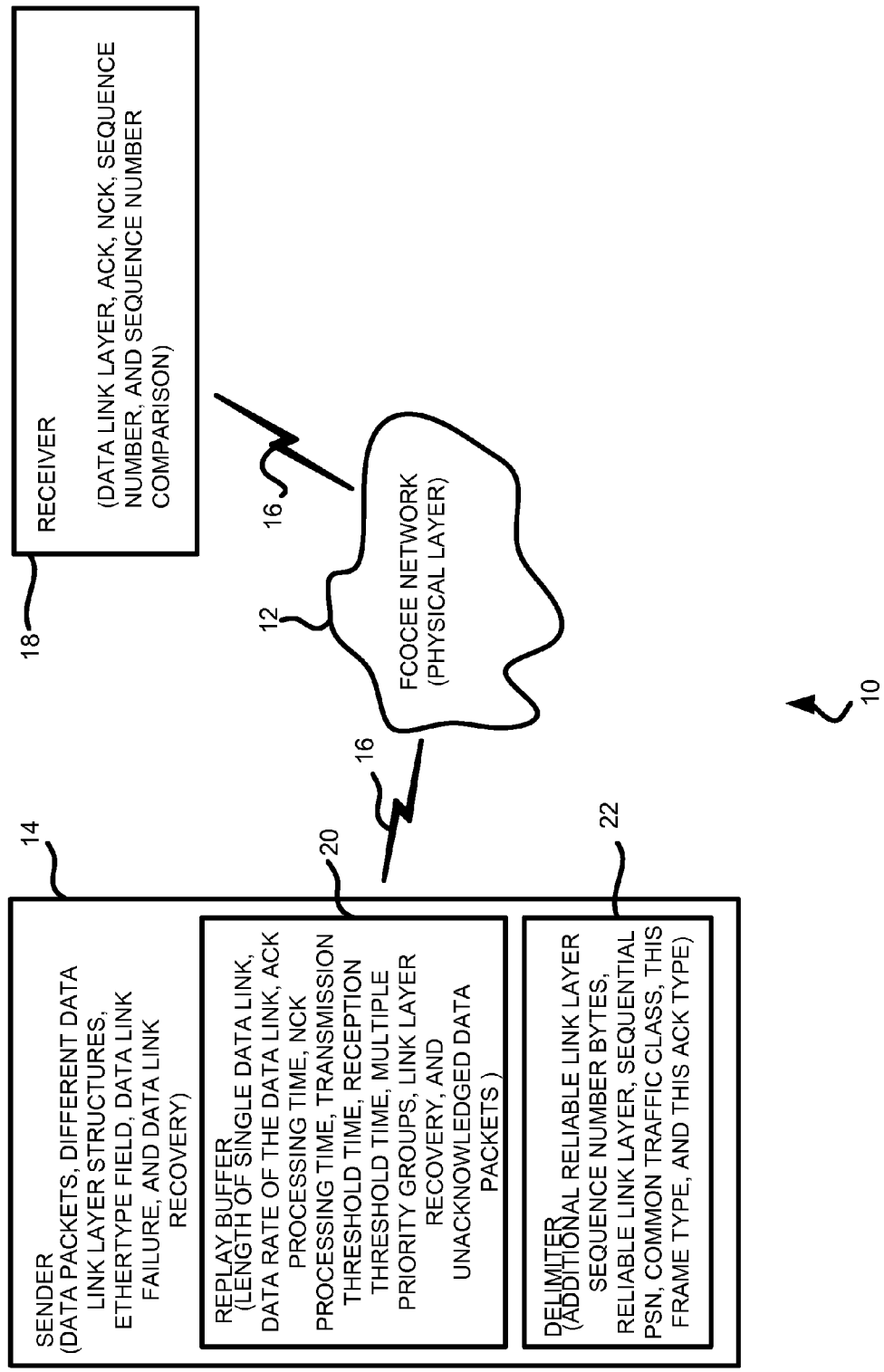
FIG. 1 is a block diagram illustrating a system to improve an FCoCEE network in accordance with an embodiment of the invention.

With reference now to FIG. 1, a system 10 to improve an FCoCEE network 12 is initially described. In one embodiment, the system 10 includes a sender 14 in the FCoCEE network 12 in which data packets having different data link layer structures are transmitted by the sender on a single data link 16. The system 10 also includes a receiver 18 in the FCoCEE network 12 that receives the data packets at a data link layer and transmits an ACK and/or NAK in response to a sequence number in the data packets. The system 10 further includes a replay buffer 20 in the FCoCEE network 12 that retransmits the data packets where the replay buffer is sized by the length of the single data link 16, data rate of the link, the ACK and/or NAK processing time at either the sender 14 and/or the receiver 18, and/or a threshold time for transmission and/or reception of the data packets. The replay buffer may operate at the FCoCEE network's 12 physical layer.

In an embodiment, the system 10 further includes a delimiter 22 to indicate additional reliable link layer sequence number bytes. In another embodiment, if a reliable link layer is enabled, sequential Packet Sequence Numbers may be grouped together as a common traffic class and/or given priority for this frame type and/or this ACK type. In another embodiment, the replay buffer 20 provides allocation to multiple priority groups with link layer recovery enabled to avoid overflow.

In an embodiment, the sender 14 modifies the data packet's EtherType field so each data packet comprises a sequence number. In another embodiment, the receiver 18 verifies and/or sends an ACK and/or NAK based on a sequence number comparison.

In an embodiment, the replay buffer 20 resends unacknowledged data packets. In another embodiment, the sender 14 refreshes the sequence numbers and/or purges the replay buffer 20 for data link failure and/or data link recovery.

Figure 2:
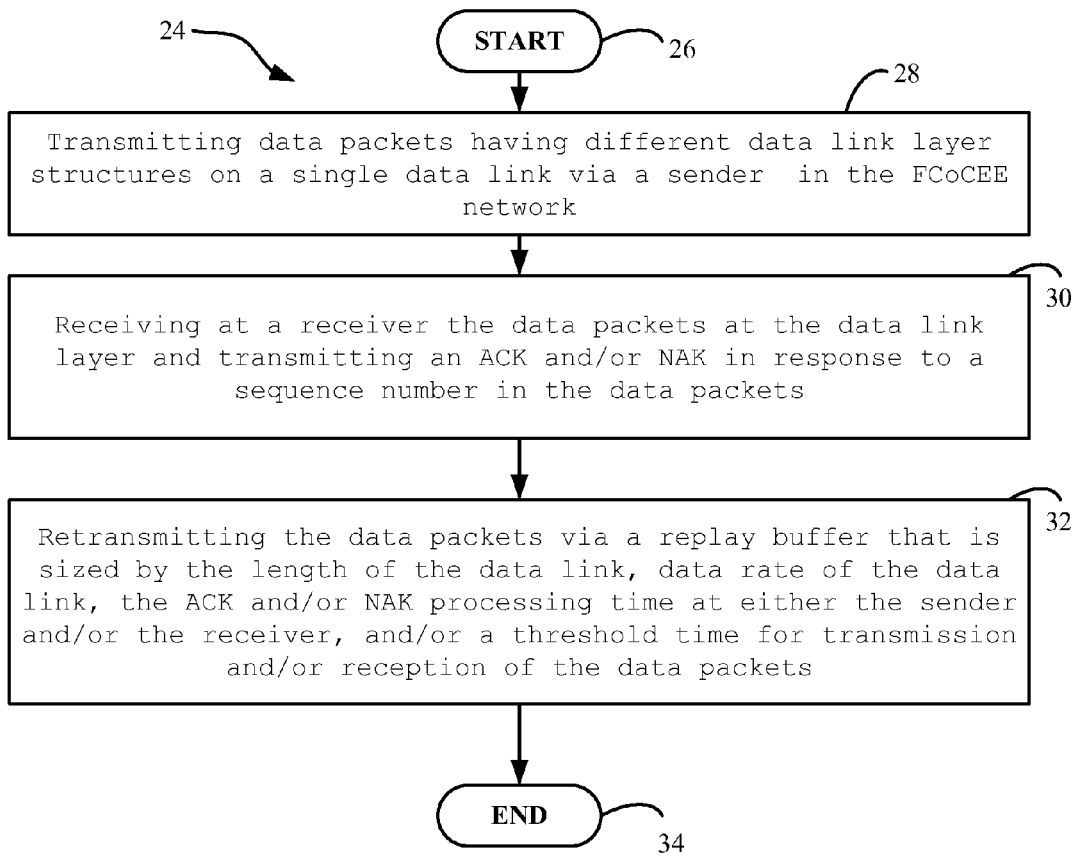
FIG. 2 is a flowchart illustrating method aspects according to an embodiment of the invention.

Another aspect of the invention is a method to improve an FCoCEE network 12 which is now described with reference to flowchart 24 of FIG. 2. The method begins at Block 26 and may include transmitting data packets having different data link layer structures on a single data link via a sender in the FCoCEE network at Block 28. The method may also include receiving at a receiver the data packets at the data link layer and transmitting an ACK and/or NAK in response to a sequence number in the data packets at Block 30. The method may further include retransmitting the data packets via a replay buffer that is sized by the length of the data link, data rate of the link, the ACK and/or NAK processing time at either the sender and/or the receiver, and/or a threshold time for transmission and/or reception of the data packets at Block 32. The method ends at Block 34.

Figure 3:
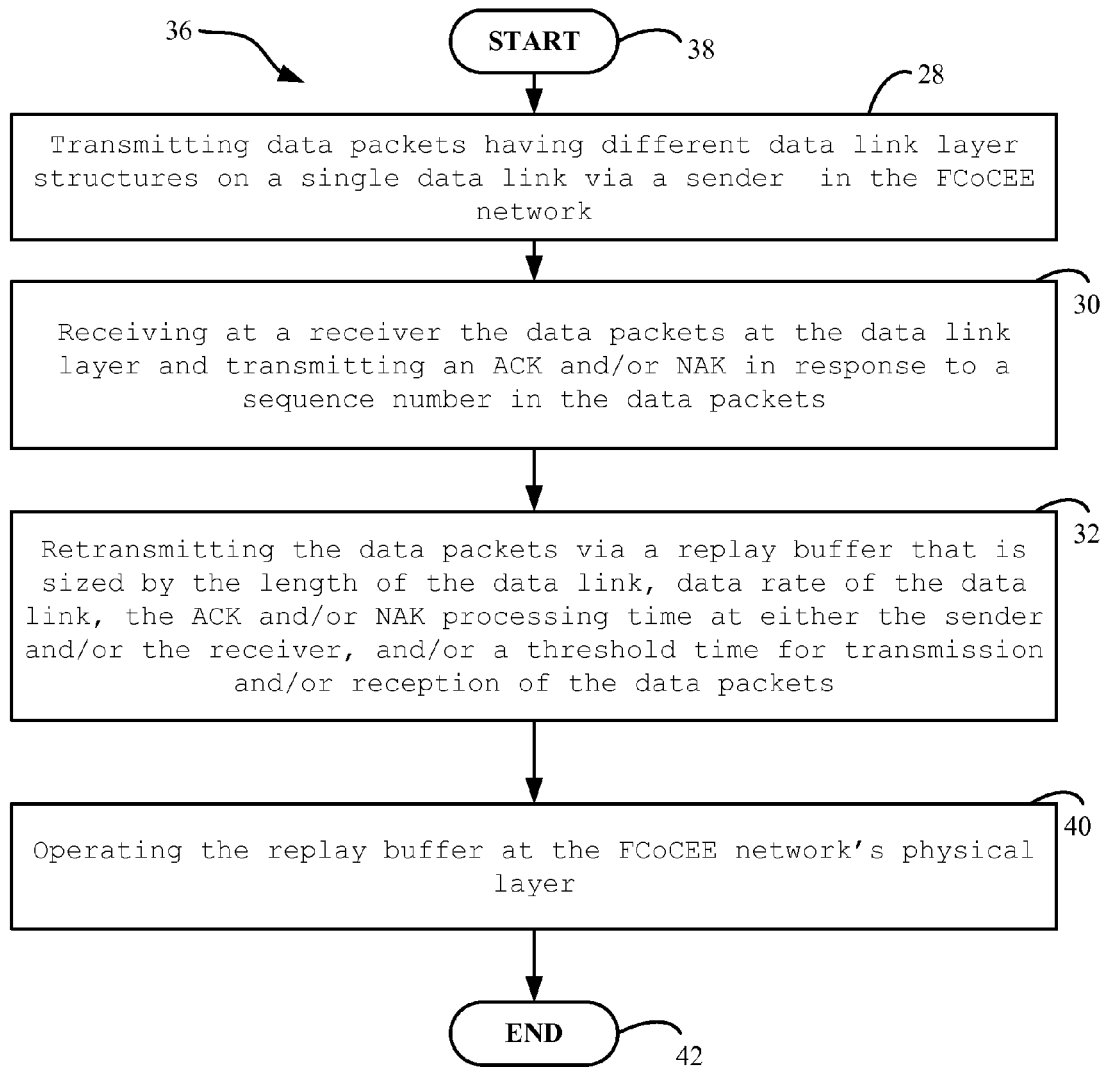
FIG. 3 is a flowchart illustrating method aspects according to the method of FIG. 2.

In another method embodiment, which is now described with reference to flowchart 36 of FIG. 3, the method begins at Block 38. The method may include the steps of FIG. 2 at Blocks 28, 30, and 32. The method may further include operating the replay buffer at the FCoCEE network's physical layer at Block 40. The method ends at Block 42.

Figure 4:
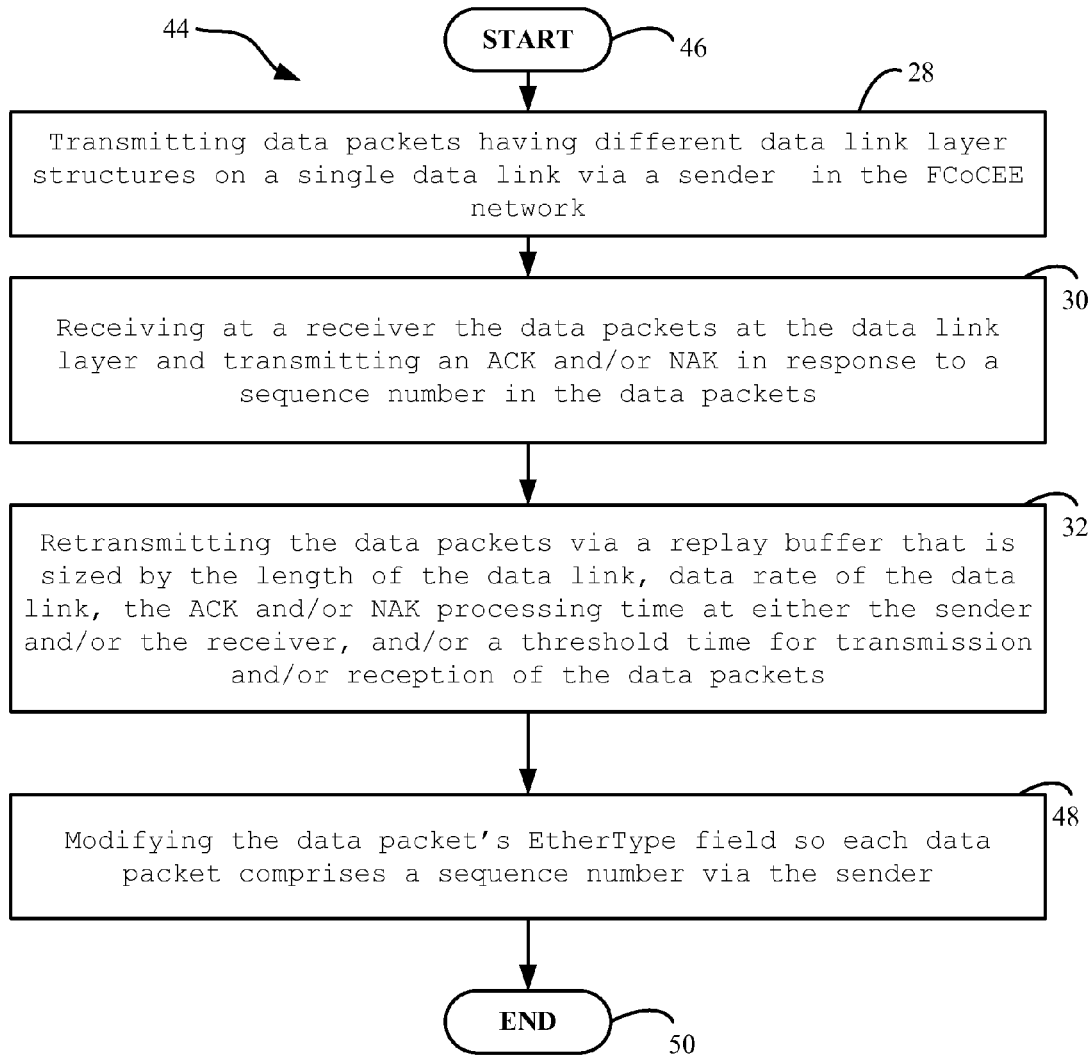
FIG. 4 is a flowchart illustrating method aspects according to the method of FIG. 2.

In another method embodiment, which is now described with reference to flowchart 44 of FIG. 4, the method begins at Block 46. The method may include the steps of FIG. 2 at Blocks 28, 30, and 32. The method may further include modifying the data packet's EtherType field so each data packet comprises a sequence number via the sender at Block 48. The method ends at Block 50.

Figure 5:
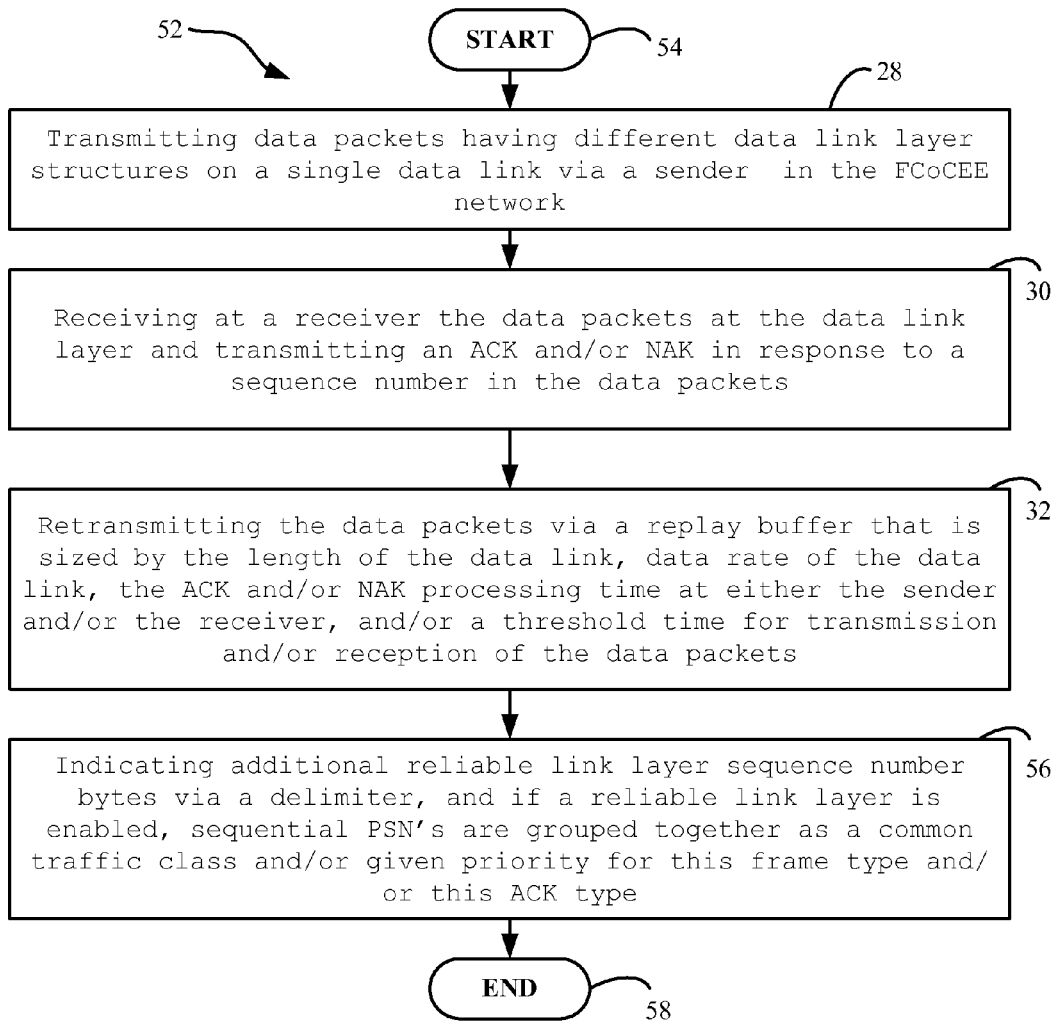
FIG. 5 is a flowchart illustrating method aspects according to the method of FIG. 2.

In another method embodiment, which is now described with reference to flowchart 52 of FIG. 5, the method begins at Block 54. The method may include the steps of FIG. 2 at Blocks 28, 30, and 32. The method may further include indicating additional reliable link layer sequence number bytes via a delimiter, and if a reliable link layer is enabled, sequential Packet Sequence Numbers are grouped together as a common traffic class and/or given priority for this frame type and/or this ACK type at Block 56. The method ends at Block 58.

Figure 6:
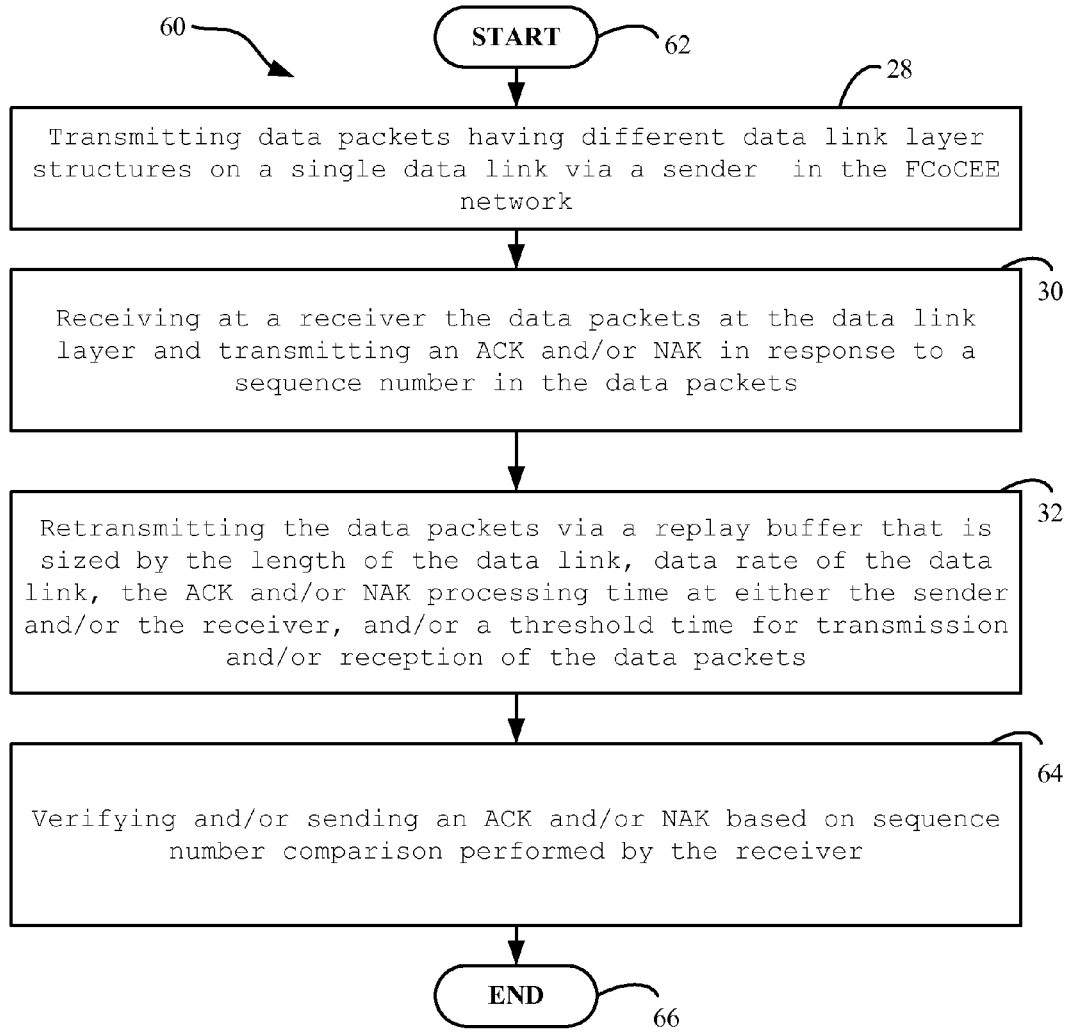
FIG. 6 is a flowchart illustrating method aspects according to the method of FIG. 2.

In another method embodiment, which is now described with reference to flowchart 60 of FIG. 6, the method begins at Block 62. The method may include the steps of FIG. 2 at Blocks 28, 30, and 32. The method may further include verifying and/or sending an ACK and/or NAK based on sequence number comparison performed by the receiver at Block 64. The method ends at Block 66.

Figure 7:
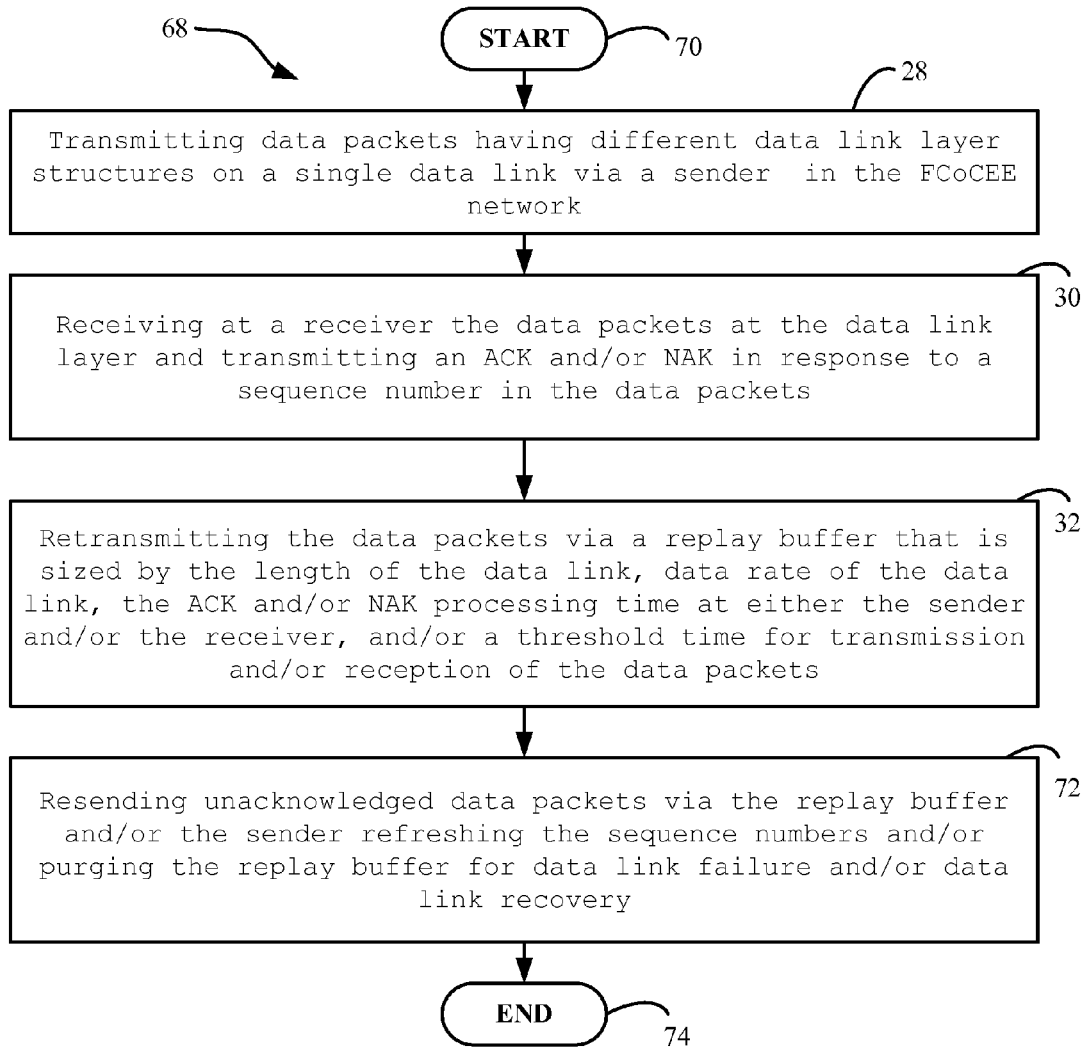
FIG. 7 is a flowchart illustrating method aspects according to the method of FIG. 2.

In another method embodiment, which is now described with reference to flowchart 68 of FIG. 7, the method begins at Block 70. The method may include the steps of FIG. 2 at Blocks 28, 30, and 32. The method may further include resending unacknowledged data packets via the replay buffer and/or the sender refreshing the sequence numbers and/or purging the replay buffer for data link failure and/or data link recovery at Block 72. The method ends at Block 74.

Another aspect of the invention is computer readable program codes coupled to tangible media to improve an FCoCEE network 12. The computer readable program codes may be configured to cause the program to transmit data packets having different data link layer structures on a single data link 16 via a sender 14 in the FCoCEE network 12. The computer readable program codes may also receive at a receiver 18 the data packets at the data link layer and transmit an ACK and/or NAK in response to a sequence number in the data packets. The computer readable program codes may further retransmit the data packets via a replay buffer 20 that is sized by the length of the single data link 16, data rate of the link, the ACK and/or NAK processing time at either the sender 14 and/or the receiver 18, and a threshold time for transmission and/or reception of the data packets.

In an embodiment, the computer readable program codes may also operate the replay buffer 20 at the FCoCEE network's 12 physical layer. In another embodiment, the computer readable program codes may additionally modify the data packet's EtherType field so each data packet comprises a sequence number via the sender 14.

In an embodiment, the computer readable program codes may also indicate additional reliable link layer sequence number bytes via a delimiter 22, and if a reliable link layer is enabled, sequential Packet Sequence Numbers are grouped together as a common traffic class and/or given priority for this frame type and/or this ACK type. In another embodiment, the computer readable program codes may additionally verify and/or send an ACK and/or NAK based on sequence number comparison via the receiver 18.

In view of the foregoing, the system 10 provides improved operation of the FCoCEE network 12. For example, Converged Fibre Channel over Converged Enhanced Ethernet (FCoCEE) networks do not define a mechanism to deliver the same level of data integrity as the networks they are intended to replace. As a result, system 10 provides a link layer retry function at the physical layer which is compatible with new FCoCEE features.

In an embodiment, system 10 provides a replay buffer 20 at the sending side of the link 16 that modifies the data link layer in a number of ways. In an embodiment, each data packet has a sequence number. In another embodiment, data packets are verified and acknowledged by the receiver 18 (ACK Coalescing is allowed).

In an embodiment, the receiver 18 sends ACKs and NAKs, depending on the sequence number comparison. In another embodiment, the sender 14 times unacknowledged packets and resends data packets.

In an embodiment, the size of the replay buffer 20 is determined by the need to encompass the maximum length of the data link 16, data rate of the link, Ack/Nak processing time at both ends of the link, and maximum transmission and reception times (the entire packet has to be received to verify the error checking, and sending the Ack/Nak packet may have to wait on a Data Packet). For example, on a 10 G link, 100 meters, system 10 estimated header overhead requires about 9 K bytes; for longer distances the buffer may extend up to 32 K bytes. System 10 intends to avoid intersections with virtual lane ("VL") buffers, which are typically implemented in the inbound path and are used exclusively for flow control. In another embodiment, link reliability uses an outbound replay buffer 20 to retransmit packets that never get to the VL buffers.

In an embodiment, system 10 provides a delimiter 22 to indicate additional reliable link layer sequence number bytes. In another embodiment, system 10 modifies FCoCEE features such as priority flow control and enhanced transmission selection ("ETS") by recognizing if the reliable link layer is enabled. If so, system 10 groups sequential Packet Sequence Numbers together as a common traffic class, and gives priority to this frame type and this ACK type. For multiple priority groups with link layer recovery enabled, system 10 will manage buffer allocation to avoid overflow.

System 10 provides a method and apparatus for implementing enhanced reliability at the link layer in a large CEE and/or FCoCEE converged network 12. CEE and FCoCEE are new emerging protocols which modify traditional Ethernet networks, in an effort to position Ethernet as the preferred convergence fabric for all types of data center traffic. The major changes include the addition of credit based flow control at the physical layer, congestion detection and data rate throttling, and the addition of virtual lanes with quality of service differentiation.

The emergence of converged fabrics within future data centers is intended to enable architectures such as cloud computing, in which multiple server, storage, and other resources are commoditized and attached to a network which provides significant added functional value. This approach is also referred to as Converged Ethernet, Low Latency Ethernet, Enhanced Ethernet, or various other names.

The cloud computing approach is realized, in part, through Blade servers and storage enabled with converged top of rack ("TOR") switches-. In this environment, there can be a significant number of switches within a single data center, forming a very large network that rivals the complexity of the external long distance network.

It is important to note that CEE and FCoCEE do not employ TCP/IP, in an effort to create a simpler, low cost approach that does not require offload processing or accelerators. Since converged fabrics are intended to operate without the overhead of TCP/IP, they have effectively no transport level recovery built in and system 10 provides an enhancement which provides a more robust link layer in order to compensate for this.

Previous versions of the Ethernet standard relied on dropped or lost packets to initiate recovery or retransmission of data, or on TCP/IP for end-to-end recovery. The bit error rate ("BER") of such links has become a limiting factor in the design of large networks with many switches, since each data packet needs to traverse more links in order to reach its destination. For example, a 10 Gbit/s Ethernet link in a 32 node switch fabric may require 12 switches with 8 ports each, and a typical packet would undergo at least 4 hops between switches before reaching its destination. Since each data packet may need to traverse multiple links with more intra-switch hops in order to reach its destination, particularly if the data center fabric supports multiple server racks sharing a common service plane, the BER probability increases. Furthermore, the BER increases as data rates increase, since many link power penalties are proportional to data rate, and many converged networks will operate at 10, 40, or 100 Gbit/s data rates.

In order to address these concerns, an end to end link recovery mechanism has been proposed for layer 3-4 of the Ethernet stack. However, this approach depends on setting network timeout values properly, which has several practical problems. Setting timeouts too short can cause a high number of retry attempts, which depletes server and network resources, and this may also increase network congestion and precipitate total fabric collapse. On the other hand, setting timeouts too low will also slow down recovery time and consequently reduce the throughput of the network. Timeout values tend to increase in larger networks, and they also increase in order to overcome local switch congestion issues. End to end techniques also require multiple replay buffers, one for each connection through the fabric. More complex recovery schemes like forward error correction ("FEC") codes require significant overhead and only recover certain types of errors (do not function well in high BER environments).

System 10 provides a new technique in which a combination of sequence numbers and timeout mechanisms at the end-to-end level are used for reliable link transmission. System 10 thus adds detection and recovery to the converged fabric physical layer. This minimizes false retry attempts due to fabric congestion, and allows end to end timeout periods to be significantly increased without affecting performance.

In system 10, link recovery is performed at the hardware layer by adding a replay buffer 20 to the transmitting node. This replay buffer 20 only needs to be large enough to accommodate the data link 16 distance, data rate of the link, ACK/NAK processing time, and max MTU transmission and reception times. In an embodiment, the replay buffer 20 is a low cost, write-only buffer, e.g. a 10 Gbit/s link 100 m long with a 4K payload may require about a 9 K buffer.

In an embodiment, each data packet has a sequence number, and the packets are verified and acknowledged by the receiver 18 as they arrive. Depending on the sequence number comparison result, the receiver 18 returns either an ACK or NAK response. In another embodiment, the sender 14 times out unacknowledged packets and resends as required from its replay buffer 20. This feature could be implemented on all the links in a fabric, or it could be tied to the converged fabric service levels and only implemented on some links in the fabric.

In an embodiment, system 10 adds information to existing fields in the CEE and/or FCoCEE packet header to indicate whether this feature is enabled. It allows backward compatibility with previous IEEE Ethernet standards. This approach is expected to be faster and more robust than the alternatives, and can respond to any type of link degradation, including unusually high BER.

System 10 provides several distinct functions that could be implemented in a data center switch fabric to add reliability features at the link level. In an embodiment, system 10 improves link layer reliability by adding link layer retry. In another embodiment, bit errors are no longer surfaced to the end to end retry mechanism.

In an embodiment, end to end timeouts may be dramatically increased. In another embodiment, system 10 reduces false retries due to fabric congestion. In another embodiment, system 10 extends the link layer by adding replay buffers 20 at the sending side, and adds a number of link layer enhancements.

In an embodiment, system 10 readjusts the replay buffer's 20 size. In another embodiment, the replay buffer 20 needs to encompass the total length of the data link 16, data rate of the link, Ack/Nak processing time at both ends of the link, and maximum transmission and reception times, e.g. the entire packet has to be received to verify the error checking, and sending the Ack/Nak packet may have to wait on a data packet in some cases. As a typical example, a 10 Gbit1s link running 100 meters may require about a 9 kbyte buffer.

In an embodiment, the replay buffer's 20 size is not necessarily designed for long links, but rather for larger switch fabrics with multiple hops. The intention is to avoid intersection with flow control buffers used on the inbound path for long distance links. However, this approach could be adapted to long distance links, for example, those required to extend the data center fabric over tens of kilometers for disaster recovery.

In another embodiment, the system 10 adds a new delimiter 22 in the DCE header field to indicate reliable link layer, e.g. should be no more than two additional bytes, preferably located in an Ethertype field, but alternately included in start of frame ("SOF") delimiter.

In an embodiment, the system 10 is built on top of existing hardware structure and link protocols. In another embodiment, the system 10 may confine new hardware to the Link Protocol Engine (LPE). In another embodiment, system 10 optionally using a hybrid scheme in which the system relies on selective retransmission as well as burst re-transmission (go back to N approach), which will not require in-order ACK/NAK transmission.

In an embodiment, system 10 could be used to improve performance of tightly coupled TOR switch solutions to server blades across a common service plane (the reliable link layer attributes could be tied to quality of service levels, set either by the switch or server). System 10 could also provide enhanced reliability in proposed hybrid system architectures utilizing a combination of System Z and Blade processors interconnected with an Ethernet fabric. This may be particularly important when interconnecting traditionally high RAS (reliability, availability, and serviceability) platforms with most cost effective commodity platforms, without sacrificing link reliability.

It is noted that FCoCEE networks should maintain the same level of data integrity established by legacy data communication networks and bit error rates may be elevated in FCoCEE networks. It is also noted that larger data center networks (5000-10000 ports of 10 G, fully provisioned) typically require more switches, which implies each packet needs to traverse more links, and this makes each packet more susceptible to link bit errors.

TOR to core link data rates may be significantly higher than today (40-80 G), which makes data rate dependent noise worse and elevates bit error rates. In addition, encapsulation of FC data results in larger frames that are more prone to data corruption.

Currently, rapid end-to-end recovery is lacking. The only mechanism currently defined for Ethernet is timeouts, which get very long in larger networks. Local switch fabric congestion further increases required timeout values. Further, setting timeouts too short causes needless retries that further increases congestion and can lead to total fabric collapse, and setting timeouts too long slows recovery time causing lower throughput.

In an embodiment, the system 10 provides improved link layer reliability by adding link layer retry at the physical layer. For example, bit errors are no longer surfaced to the end-to-end retry mechanism and this minimizes end-to-end timeout intervals and false retries due to fabric congestion.

In an embodiment, the system 10 extends the link layer by adding replay buffers 20 at the sending side 14. In another embodiment, the link reliability uses an outbound replay buffer 20 to retransmit packets that never get to the VL buffers. It is noted that link reliability can be independent of VLs.

Figure 8:
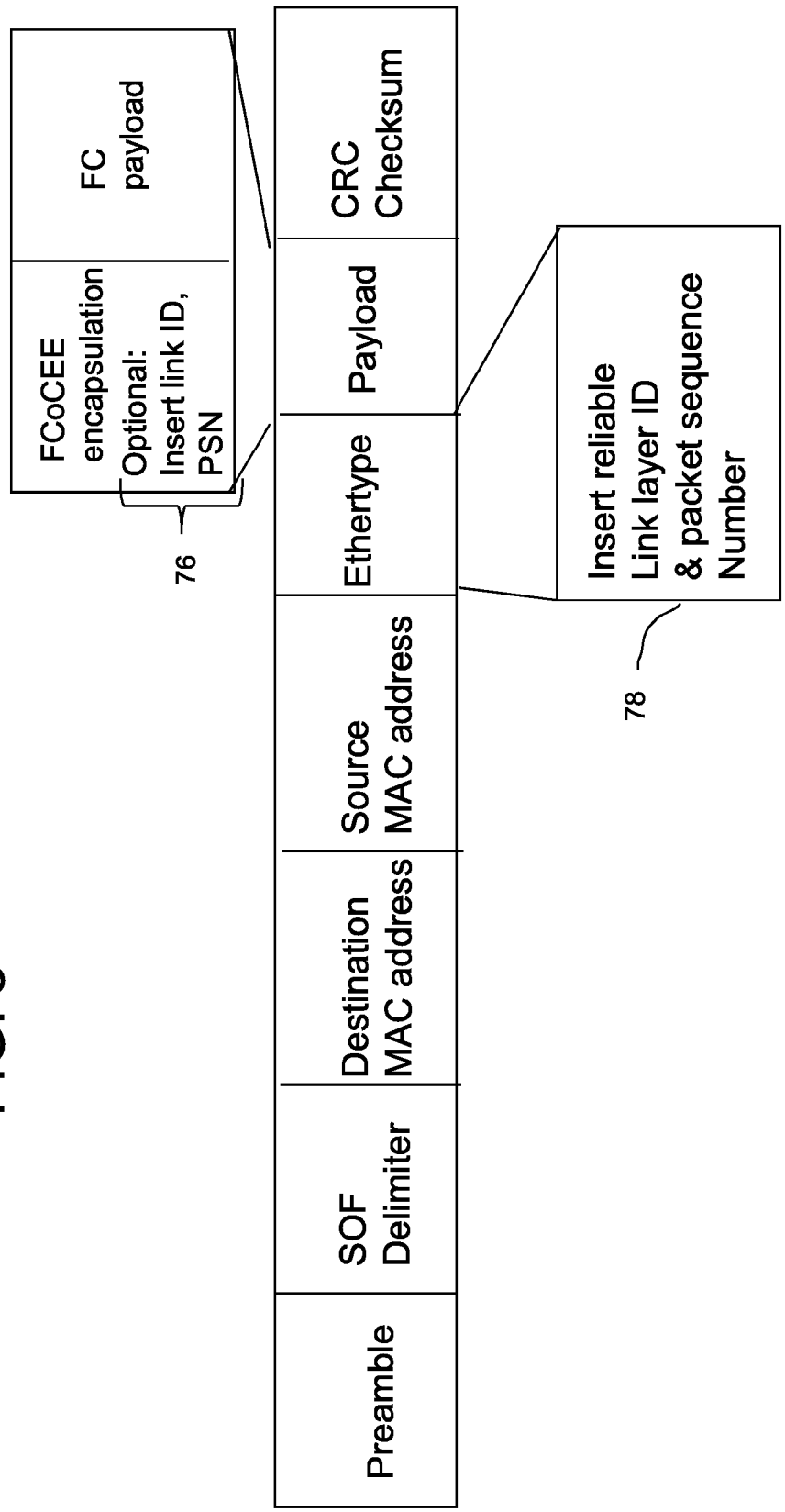
FIG. 8 is a block diagram illustrating modifications to existing frame type in accordance with an embodiment of the invention.

In an embodiment and with additional reference to FIG. 8, the modifications to existing frame type as used by system 10 are indicated as reference callouts 76 and 78. As such, system 10 maintains backward compatibility with current frames.

Figure 9:
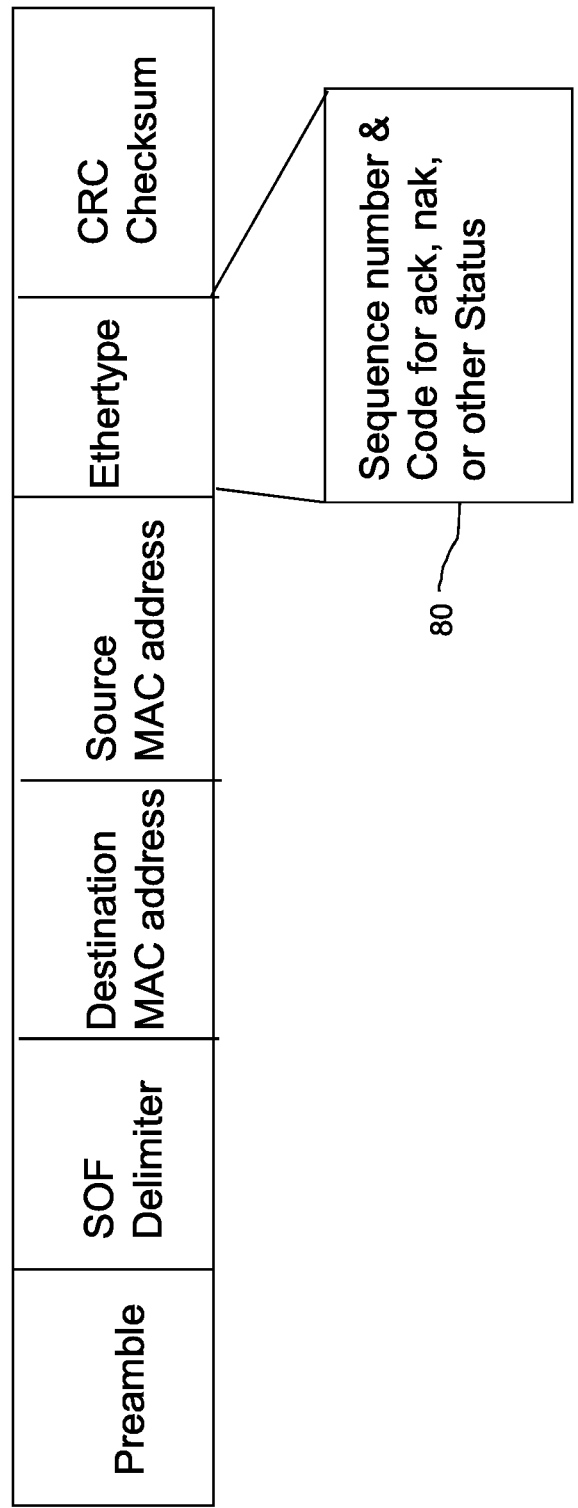
FIG. 9 is a block diagram illustrating modifications to existing frame acknowledgment in accordance with an embodiment of the invention.
Figure 10:
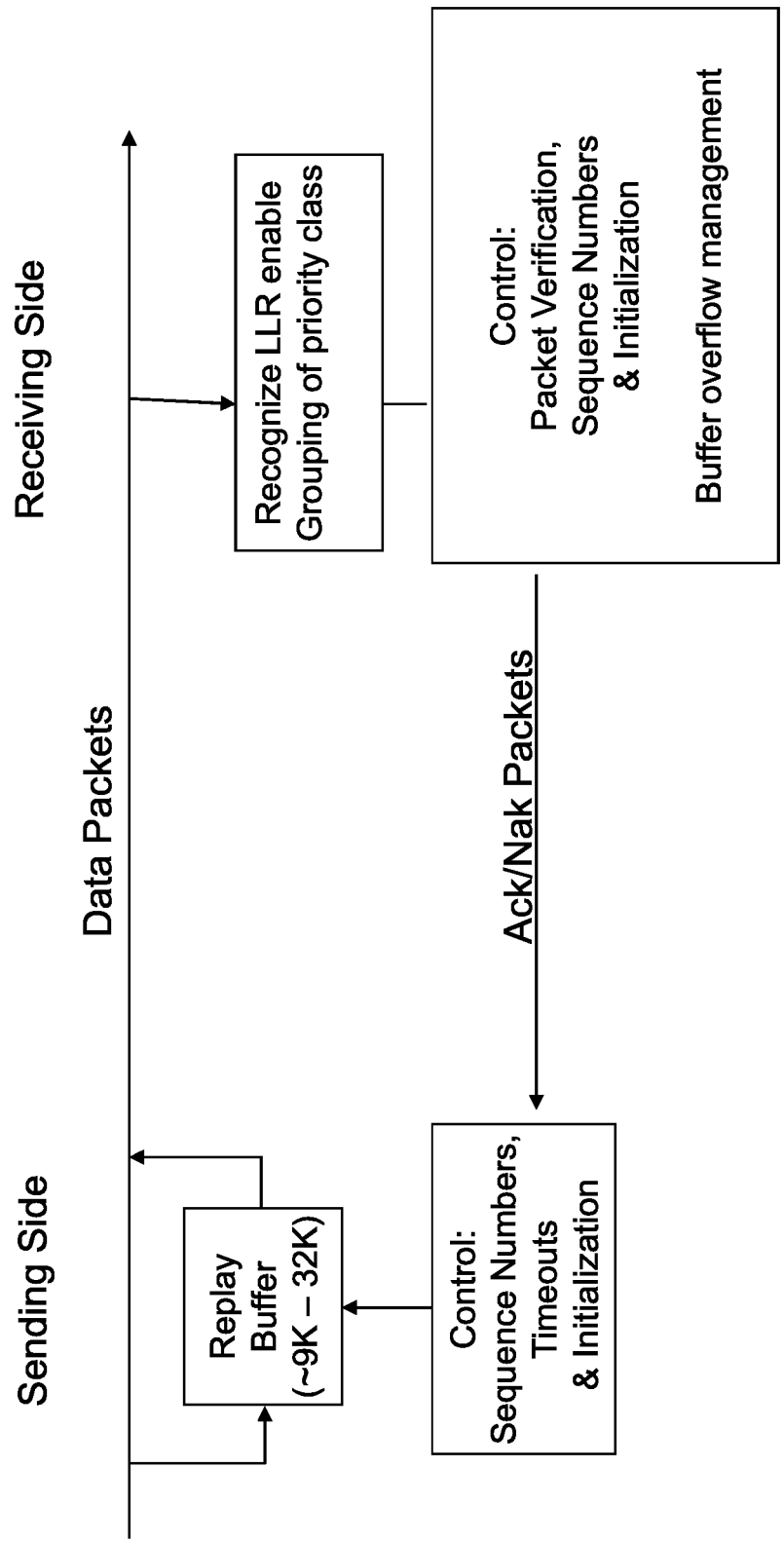
FIG. 10 is a block diagram of an exemplary approach to improve an FCoCEE network in accordance with an embodiment of the invention.

In an embodiment and with additional reference to FIG. 9, the modifications to existing frame acknowledgement as used by system 10 are indicated by reference character 80. As such, system 10 maintains backward compatibility with current frames. In another embodiment, reliable link layer data flow of system 10 is illustrated in FIG. 10.

As will be appreciated by one skilled in the art, the invention may be embodied as a method, system, or computer program product. Furthermore, the invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the invention may be written in an object oriented programming language such as Java, Smalltalk, C++ or the like. However, the computer program code for carrying out operations of the invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It should be noted that in some alternative implementations, the functions noted in a flowchart block may occur out of the order noted in the figures. For instance, two blocks shown in succession may, in fact, be executed substantially concurrently, or the blocks may sometimes be executed in the reverse order, depending upon the functionality involved because the flow diagrams depicted herein are just examples. There may be many variations to these diagrams or the steps (or operations) described therein without departing from the spirit of the invention. For example, the steps may be performed concurrently and/or in a different order, or steps may be added, deleted, and/or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
receiving, using a computer processor, at a receiver data packets having different data link layer structures on a single data link at a data link layer via a sender through a Fibre Channel over Convergence Enhanced Ethernet (FCoCEE) and transmitting at least one of an acknowledge signal (ACK) and a no acknowledge signal (NAK) in response to a sequence number in the data packets;
retransmitting the data packets via a replay buffer that is sized by at least one of length of the single data link, data rate of the single data link, at least one of ACK and NAK processing time at either the sender or the receiver, and at least one of a threshold time for transmission and reception of the data packets;
indicating additional reliable link layer sequence number bytes via a delimiter, and if a reliable link layer is enabled, sequential Packet Sequence Numbers are at least one of grouped together as a common traffic class and given priority for at least one of this frame type and this ACK type; and
modifying the data packet's EtherType field so each data packet comprises a sequence number via the sender.

2. The method of claim 1 further comprising operating the replay buffer at the FCoCEE network's physical layer.

3. The method of claim 1 further comprising at least one of verifying and sending at least one of an ACK and an NAK based on sequence number comparison performed by the receiver.

4. The method of claim 1 further comprising at least one of resending unacknowledged data packets via the replay buffer, and the sender refreshing the sequence numbers and purging the replay buffer for at least one of data link failure and data link recovery.

* * * * *